(12) United States Patent
Demeilliez et al.

(10) Patent No.: US 11,556,451 B2
(45) Date of Patent: Jan. 17, 2023

(54) METHOD FOR ANALYZING THE RESOURCE CONSUMPTION OF A COMPUTING INFRASTRUCTURE, ALERT AND SIZING

(71) Applicant: BULL SAS, Les Clayes-sous-Bois (FR)

(72) Inventors: Bruno Demeilliez, Saint Laurent du Pont (FR); Gilles Menigot, Froges (FR)

(73) Assignee: BULL SAS, Les Clayes-sous-Bois (FR)

( * ) Notice: Subject to any disclaimer, the term of this patent is extended or adjusted under 35 U.S.C. 154(b) by 339 days.

(21) Appl. No.: 16/927,344

(22) Filed: Jul. 13, 2020

(65) Prior Publication Data

US 2021/0026755 A1  Jan. 28, 2021

(30) Foreign Application Priority Data

Jul. 15, 2019  (FR) ...................................... 1907972

(51) Int. Cl.
*G06F 11/34* (2006.01)
*G06F 30/20* (2020.01)
*G06F 11/30* (2006.01)
*G06F 111/10* (2020.01)

(52) U.S. Cl.
CPC ...... *G06F 11/3495* (2013.01); *G06F 11/3006* (2013.01); *G06F 30/20* (2020.01); *G06F 2111/10* (2020.01)

(58) Field of Classification Search
CPC ............. G06F 11/3006; G06F 11/3433; G06F 11/3442; G06F 11/3447; G06F 11/3452; G06F 11/3495; G06F 30/20; G06F 2111/10; G06F 2201/81; G06F 11/30; G06F 11/343

USPC ......................................................... 702/186
See application file for complete search history.

(56) References Cited

U.S. PATENT DOCUMENTS

| | | | |
|---|---|---|---|
| 10,366,346 B2 * | 7/2019 | Achin | ..................... G06N 20/00 |
| 10,496,927 B2 * | 12/2019 | Achin | ..................... G06N 5/02 |
| 10,558,924 B2 * | 2/2020 | Achin | ..................... G06F 9/5011 |
| 2011/0246837 A1 | 10/2011 | Kato | |
| 2017/0091630 A1 | 3/2017 | Yoshida | |
| 2017/0139794 A1 | 5/2017 | Yoshinaga | |

OTHER PUBLICATIONS

Search Report issued in FR1907972 dated Jul. 15, 2019 (11 pages).

* cited by examiner

*Primary Examiner* — John H Le
(74) *Attorney, Agent, or Firm* — Arc IP Law, PC; Joseph J. Mayo

(57) ABSTRACT

A method and a device for analyzing a consumption of resources in a computing infrastructure to predict a resource consumption anomaly on a computing device. The method includes determining a plurality of resource consumption modeling functions; determining a correlation between the resource consumption modeling functions; measuring a resource consumption by a measurement of a consumption value of a first resource; and predicting the resource consumption of the computing infrastructure. The predicting includes a calculation of a value of future consumption of a resource to be predicted from the consumption value of the first resource and from a previously calculated correlation between modeling functions.

14 Claims, 8 Drawing Sheets

|  | Day 1 | |
|---|---|---|
| 0 h | A : CPU | B : DISK |
| | MFc 1 | MFd 1 |
| | MFc 2 | |
| | MFc 3 | MFd 2 |
| | MFc 4 | |
| | MFc 5 | MFd 3 |
| 24 h | | |

|  | Day 2 | |
|---|---|---|
| 0 h | A : CPU | B : DISK |
| | MFc 7 | MFd 1' |
| | MFc 2' | |
| | MFc 3' | MFd 2' |
| | MFc 4' | |
| | | MFd 3' |
| 24 h | | |

|  | Day 3 | |
|---|---|---|
| 0 h | A : CPU | B : DISK |
| | MFc 1 | MFd 1'' |
| | MFc 2'' | |
| | | MFd 2'' |
| | MFc 4'' | |
| 24 h | | |

|  | Day n | |
|---|---|---|
| 0 h | CPU | B : DISK |
| | | MFd $1^n$ |
| | MFc $2^n$ | |
| | | MFd $2^n$ |
| | MFc $4^n$ | |
| 24 h | | |

FIG. 2

| A | | | B | | | C | | |
|---|---|---|---|---|---|---|---|---|
| Resource 1 ||| Resource 1 ||| Resource 1 |||
| Period 1 ||| Period 1 ||| Period 1 |||
| Interval 1 | MF 1 | | | | | Interval 1 | MF 7 | |
| | | | | | | Interval 2 | MF 8 | |
| | | | Interval 1 | MF 5 | | Interval 3 | MF 9 | |
| Interval 2 | MF 2 | | | | | Interval 4 | MF 10 | |
| | | | | | | Interval 5 | MF 11 | |
| Interval 3 | MF 3 | | | | | Interval 6 | MF 12 | |
| | | | Interval 2 | MF 6 | | Interval 7 | MF 13 | |
| Interval 4 | MF 4 | | | | | Interval 8 | MF 14 | |

FIG. 4

METHOD FOR ANALYZING THE RESOURCE CONSUMPTION OF A COMPUTING INFRASTRUCTURE, ALERT AND SIZING

The invention is related to the field of monitoring computing infrastructures, and more particularly to the field of analyzing the consumption of resources of a computing infrastructure. The invention relates in particular to a method for analyzing consumption of resources in a computing infrastructure. The invention also relates to a device for analyzing the consumption of a resource in a computing infrastructure.

PRIOR ART

Computing infrastructures represent a major portion of a company's investment. The proper management thereof is a strategic challenge in order to be able to control the cost thereof, but also in order to guarantee reliable, optimized access to the different business data in the information system and to ensure correct and timely functioning of the computing infrastructures.

Over time, information system administrators generally evolve their computing infrastructure so as to always offer efficient business application services that are suited to their organization's requirements. For example, following an increase in a certain group of users, there may be an increase in the consumption of resources by certain business applications, and it may therefore be advantageous to reorganize this computing infrastructure. Alternatively, an evolution in application blocks, a modification of an application block leading to a reduction in the resource consumption thereof, or else an improvement in a computing infrastructure may lead to an increase in available resources. There are methods for measuring performance (benchmarks), with the aim of sizing, based on a given use, a new computing infrastructure.

Nonetheless, these systems currently appear to be insufficient. Indeed, when an application is in production on a computing infrastructure, it may experience large evolutions in usage (i.e. load) over time, with variations throughout the day (working hours versus the rest of the day), throughout the week (Wednesday being a day off for certain employees, rest days versus working days), throughout the week and throughout the year (monthly, quarterly or annual closure periods, etc.).

These variations in usage are reflected in real terms at the hardware level by similar variations in the consumption of resources. Thus, information system administrators must also deal with variations in the usage of the resources over time, forming periods of greater or lesser stressing of the computing infrastructures.

To date, solutions exist that make it possible, via portals, to monitor the current usage of the resources and to compare it to threshold levels. This automatic analysis may generate warnings, sent to the operations manager, who will have to decide on the possible corrective actions to be undertaken. Nonetheless, it is difficult to precisely estimate the actual demand for resources in a given period of time and in real time, since the administrator has to base this on historic facts and anticipate by themselves a potential risk (i.e. overload, saturation, etc.). In addition, during an increase in load on a computing system, resource saturations appear one after the other. Thus, saturation of a first resource does not make it possible to observe the following saturations, since the system can no longer increase capacity once a saturation has appeared. Moreover, none of these solutions generates recommendations of evolutions to the infrastructure. It is the operations manager's role to deduce the necessary evolutions to make, based on the warnings.

Other solutions have been developed (US2017/0139794) that consist of determining correlations between resources in order to generate correlation models to detect errors in the correlations predicted by the models. These solutions work by calculating the reliability of a correlation and by analyzing correlation variations. Nonetheless, these solutions are time-consuming for administrators and do not enable real-time estimation of the actual demand for resources. Indeed, the administrator might be able to detect a correlation anomaly without being able to predict the resource consumption and therefore detect an operating anomaly.

Thus, there is a need for novel methods or devices that make it possible to analyze, then to manage, a computing infrastructure such that it has a suitable amount of resources for the specific requirements of the applications of the information system (IS). In particular, there is a need for novel methods or devices that make it possible to reliably and precisely predict an anomaly such as overload or a saturation in consumption of a resource of a computing infrastructure comprising a plurality of servers.

TECHNICAL PROBLEM

The object of the invention is therefore to overcome the shortcomings of the prior art. In particular, the aim of the invention is to propose a method for analyzing consumption of resources in a computing infrastructure, said computing infrastructure comprising a plurality of computing devices, for the prediction of a resource consumption anomaly on a computing device. The method is quick and easy to implement, with a small number of steps, and makes it possible to manage costs associated with the management of a computing infrastructure. The method particularly makes it possible to predict a resource consumption anomaly, to predict a saturation or overload, and therefore a malfunctioning of a computing infrastructure. The method further makes it possible to predict future consumption based on current consumption, in real time. Additionally, the method makes it possible to generate new, adapted sizing values.

Another aim of the invention is to propose a device for analyzing consumption of resources in a computing infrastructure for predicting a resource consumption anomaly (i.e. overload or saturation), said device making it possible to predict the evolution in consumption and the overloads or saturations of the resources, in particular during increased load, and to predict the sizing of the resources of one or more servers.

BRIEF DESCRIPTION OF THE INVENTION

To this end, the invention relates to a method for analyzing consumption of resources in a computing infrastructure, said computing infrastructure comprising a plurality of computing devices, for the prediction of a resource consumption anomaly on a computing device, said method comprising:
  a step of determining, for a given period, a plurality of resource consumption modeling functions, each of said functions modeling the temporal evolution in the consumption of a resource for a time interval of the period;
  a step of determining a correlation between said resource consumption modeling functions, said correlation determination step comprising the calculation of at least one correlation between modeling functions, preferably for different time intervals;

a step of measuring a resource consumption, said step comprising a measurement of a consumption value of a first resource; and a step of predicting the resource consumption of the computing infrastructure, said prediction step comprising a calculation of a value of future consumption of a resource to be predicted, from the consumption value of the first resource and from a previously calculated correlation between modeling functions, said previously calculated correlation then corresponding to a correlation between a modeling function of the first resource and a modeling function of the resource to be predicted.

Such a method makes it possible, based on a measurement of a consumption of a resource, to calculate the future consumption of this same resource or else of another resource. It is based on a combination of using modeling functions and correlation functions linking these modeling functions. Thus, the method makes it possible to predict future consumption based on measured consumptions in real time.

According to other optional characteristics of the method:

the method comprises a step of generating a plurality of redundant modeling functions over the same period. It is thus possible to select the most accurate modeling functions and therefore to increase the performance of the method.

the method comprises a step of segmenting the given period into a plurality of time intervals for each resource of each computing device. In particular, the time intervals resulting from the segmentation of the given period are defined based on the modeling functions or based on a predetermined temporal segmentation.

the method comprises a step of proximity searching between modeling functions, said proximity search being carried out between modeling functions of the same resource and of different data periods. The identification of close modeling functions makes it possible to create groups and therefore to identify the most relevant modeling functions.

the method comprises a step of identifying a frequency of repetition of the modeling functions and of selecting, for each time interval, the modeling function most representative of this time interval for a set of periods considered. A modeling function frequently found within the periods will be more able to provide relevant results.

the previously calculated correlation is a function of correlation between two modeling functions. The presence of correlation functions makes it possible to better represent the complexity of relationships/links between two modeling functions.

it comprises a step of identifying a frequency of repetition of correlations. Such identification can improve the results of the method.

it comprises a step of determining a degree of reliability of a correlation, and deleting correlations having a degree of reliability below a predetermined threshold. Such determination can improve the results of the method.

it further comprises a step of identifying a resource with an anomaly risk, said identification step comprising comparing a value of future consumption of a resource to be predicted to a predetermined monitoring threshold value, the resource to be predicted having to a resource with an anomaly risk when a predetermined monitoring threshold value is exceeded.

it further comprises a step of generating new sizing values for the computing infrastructure, said generation step comprising a selection of new values of amount of resources allocated to at least one computing device composing the computing infrastructure, said new resource amount values comprising, for the resource to be predicted, an allocated resource amount value greater than the calculated future consumption value.

the prediction step comprises calculating a value of future consumption of a resource from the consumption value of this same resource and from a previously calculated correlation between modeling functions.

the prediction step comprises calculating a value of future consumption of a resource from the consumption value of a plurality of resources and from a previously calculated correlation between modeling functions.

it comprises a step of generating at least one optimized sizing plan, said generation step comprising the selection of new values of amount of resources allocated for the optimized sizing plan for which the resource consumption is lower than predetermined maximum consumption values based on the established predictions.

the prediction step makes it possible to predict the consumption of one or more resources and thereby to prevent any anomaly in the resource consumption on the computing infrastructure.

According to another aspect, the invention relates to a device for analyzing consumption of resources in a computing infrastructure, said computing infrastructure comprising a plurality of computing devices, for the prediction of a resource consumption anomaly on a computing device, said method comprising:

a modeling module configured to determine, for a given period, a plurality of resource consumption modeling functions, each of said functions modeling the temporal evolution in the consumption of a resource for a time interval of the period;

a calculation module configured to determine a correlation between said resource consumption modeling functions, the correlation determination step comprising the calculation of at least one correlation between modeling functions, preferably for different time intervals;

at least one probe configured to measure resource consumption, the resource consumption measurement comprising the measurement of a consumption value of a first resource; and a module for predicting the resource consumption of the computing infrastructure, configured to calculate a value of future consumption of a resource to be predicted, from the consumption value of the first resource and from a previously calculated correlation between modeling functions, said previously calculated correlation then corresponding to a correlation between a modeling function of the first resource and a modeling function of the resource to be predicted.

According to another aspect, the invention relates to a computing infrastructure comprising a plurality of computing devices, said computing infrastructure comprising an analysis device according to the invention.

Other advantages and features of the invention will become apparent upon reading the following description, given by way of illustrative and non-limiting example, with reference to the accompanying drawings:

FIG. 1 shows a functional diagram of the method of the invention according to one embodiment. The steps represented by dashed lines are optional.

FIG. 2 shows an illustration of modeling functions based on resources (CPU, DISK) and on periods (day 1, day 2, day 3, day n).

FIG. 4 shows an illustration of different configurations of combinations of modeling functions for the same resource and over the same period (configuration A: period divided into four time intervals, configuration B: period divided into two time intervals, configuration C: period divided into eight time intervals).

Figure 5:
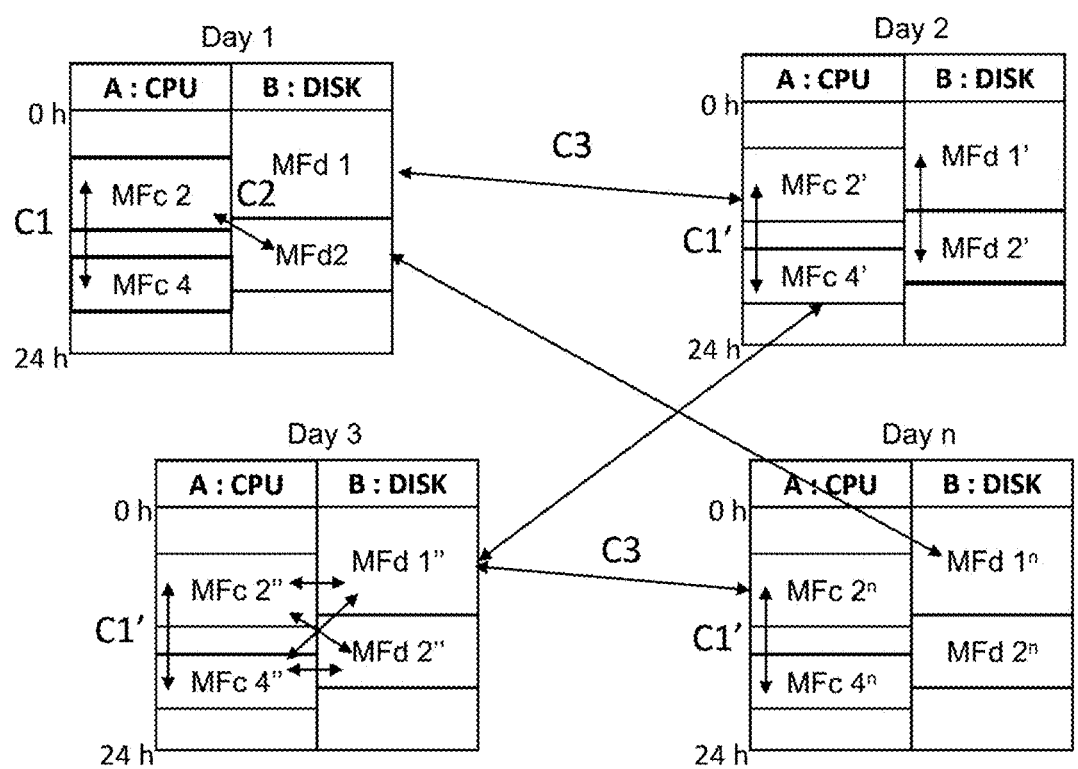

FIG. 5 shows an illustration of modeling functions based on resources (CPU, DISK) and on periods (day 1, day 2, day 3, day n) and integrating correlations between modeling functions (C1, C2, C3).

Figure 6:
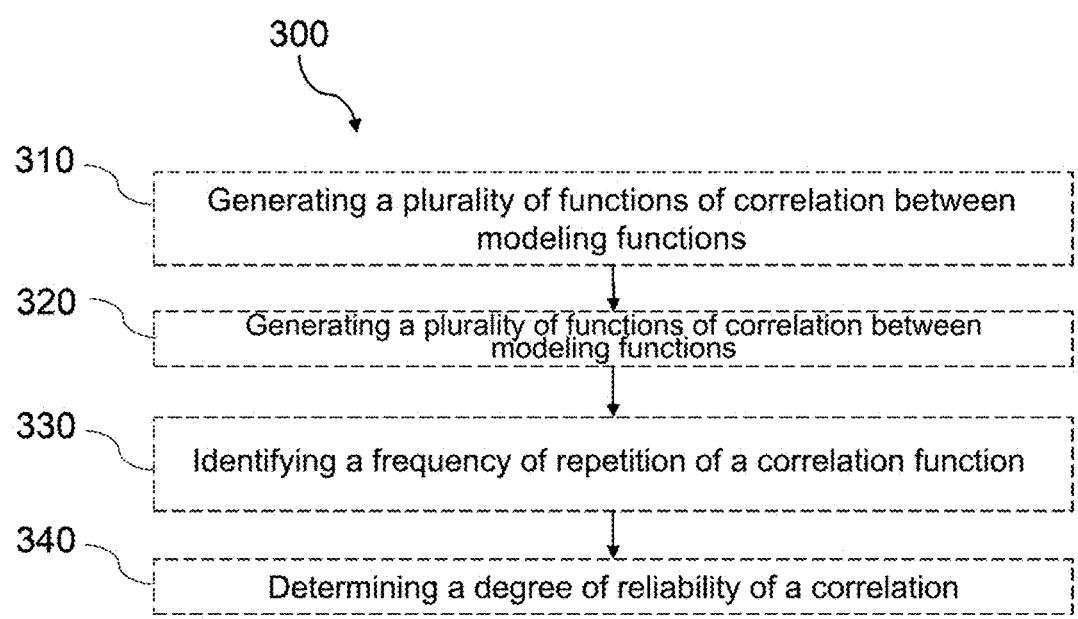

FIG. 6 shows the sub-steps of a step for determining correlation between modeling functions according to one embodiment of the invention.

Figure 7:
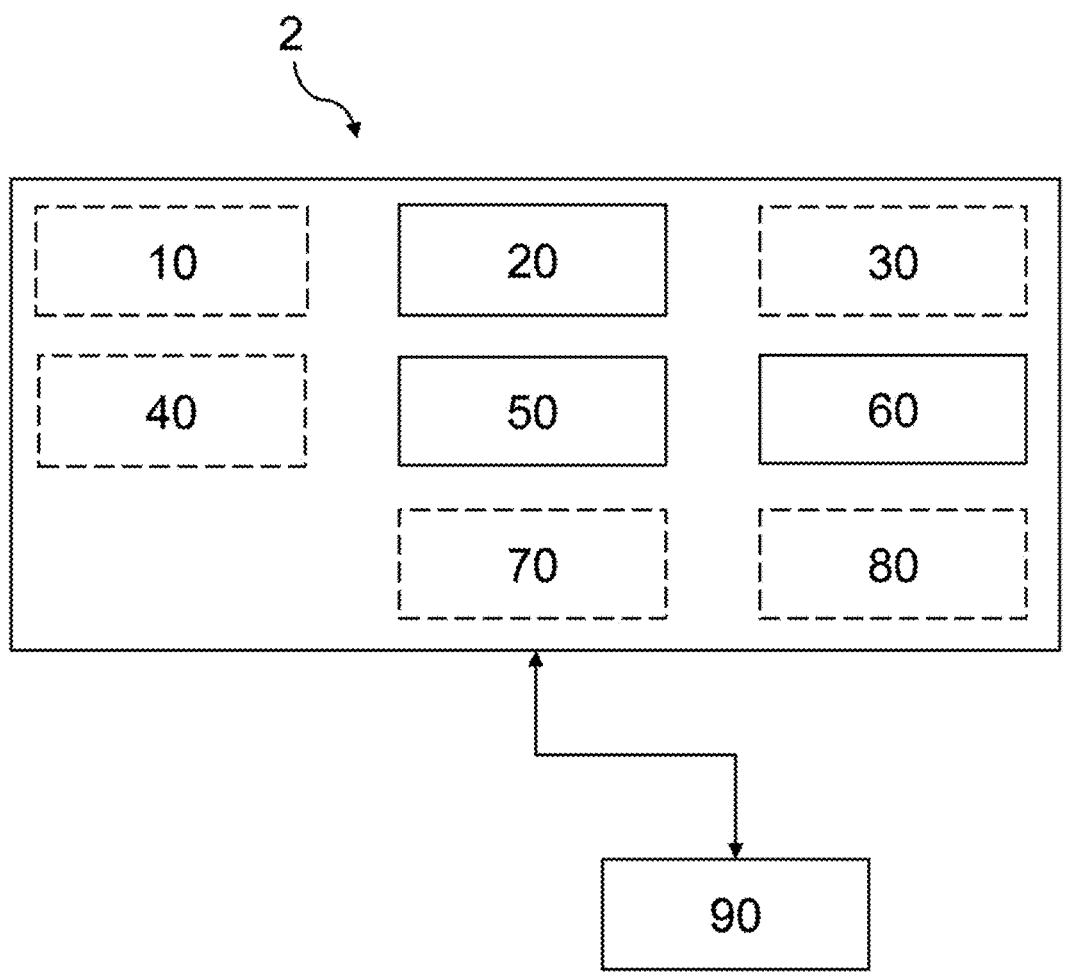

FIG. 7 shows a diagram of a device according to one embodiment of the invention.

Figure 8:
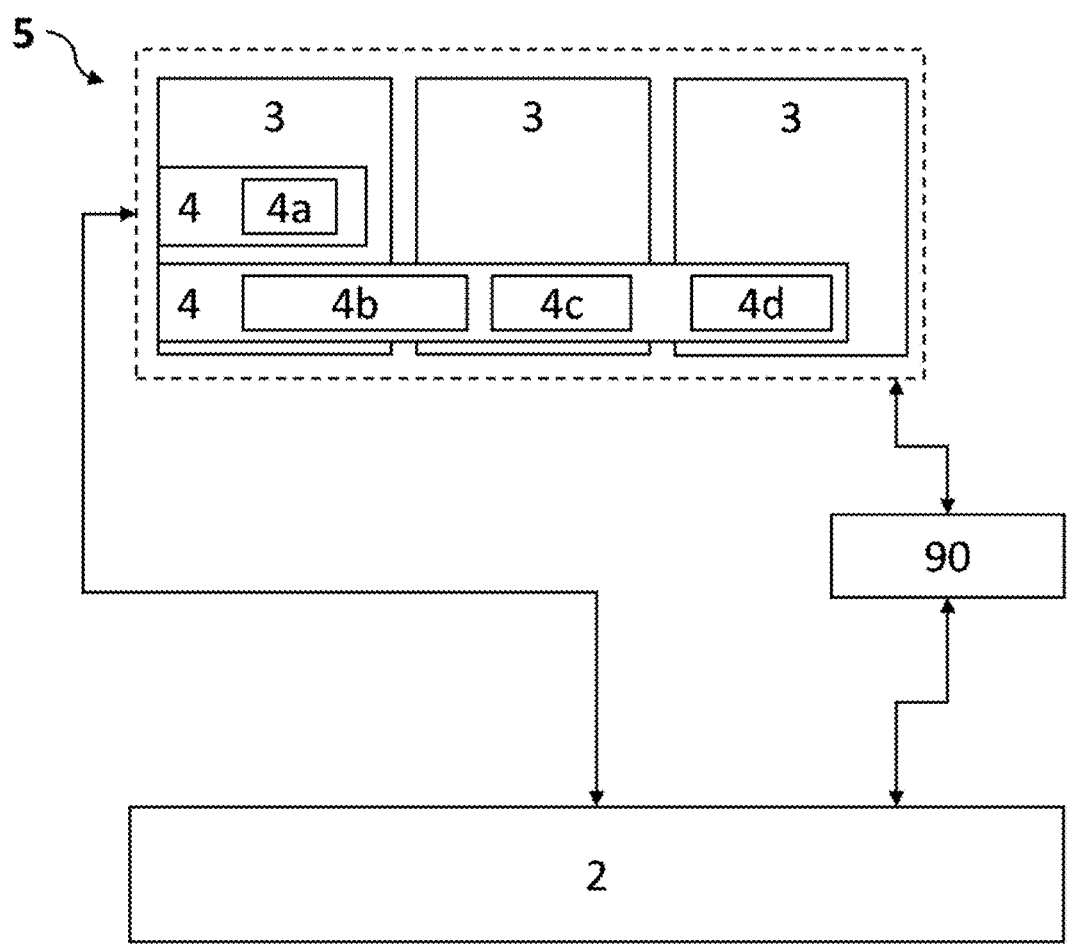

FIG. 8 shows a diagram of a computing infrastructure integrating a device according to one embodiment of the invention.

Some aspects of the present invention are disclosed with reference to flow charts and/or to functional diagrams of methods, devices (systems) and computer program products according to embodiments of the invention.

In the drawings, the flow charts and functional diagrams illustrate the architecture, the functionality and the operation of possible implementations of systems, methods and computer program products according to various embodiments of the present invention. In this respect, each block in the flow diagrams or block diagrams may represent a system, device, module or code, which comprises one or more executable instructions to implement the specified logical function(s). In some implementations, the functions associated with the blocks may appear in a different order than that shown in the figures. For example, two blocks shown in succession may, in fact, be executed substantially simultaneously, or the blocks may sometimes be executed in the reverse order, depending on the functionality involved. Each block in the block diagrams and/or flow diagrams, and combinations of blocks in the block diagrams and/or flow diagrams, may be implemented by special hardware systems that perform the specified functions or execute or perform combinations of special hardware and computer instructions.

DESCRIPTION OF THE INVENTION

In the remainder of the description, "Resource" or "Hardware resource" is intended to mean parameters, capacities or functions of computing devices enabling the operation of an application block, an application or an application chain. The same computing device is generally associated with several resources. Likewise, the same resource is generally shared between several application chains. For example, the term "resource" may include: network disks characterized for example by the inputs/outputs thereof, reading/writing from/to disks, the rate of usage of the memory, a network characterized by the bandwidth thereof, a processor characterized for example by its usage (as a percentage), or the occupancy level of the caches thereof, a random access memory characterized by the amount allocated, or more generally the latency of a process or the packet losses. It is not necessary to monitor all the resources of a computing infrastructure in order to implement the method according to the invention, and it is possible to form a group of critical resources, the usage of which is particularly important. "Usage of resources" is intended to mean the consumption of a resource for example by a business application.

For the purposes of the invention, "level of usage of a resource" is intended to mean a value representative of the consumption or the occupancy of said resource during the operation of an application chain. For example, the usage value may correspond, for network disks, to the inputs/outputs thereof, the reading/writing to/from disks, the rate of usage of the memory, for a network, to the bandwidth thereof, for processors, to the usage thereof (as a percentage) or the occupancy rate of the caches, for random access memory, to the amount used, and for ports, to the number of ports that have been opened simultaneously during the operation of the method. The usage value is advantageously given as a percentage of the level of the resource.

For the purposes of the invention, "predetermined monitoring threshold" is intended to mean a parameter threshold value beyond which an action will be triggered in the context of the invention. Such a threshold generally enables proper operation of a resource and may correspond to a maximum usage level for a resource. For example, this may correspond to the maximum acceptable limits for consumption of resources for a computing structure hosting one or more application blocks. These limits may be real or hypothetical and generally correspond to a level of usage beyond which faults may arise, with the consequence of stoppage of the resource, the computing structure or else at the very least reduced quality of service. This threshold may be predetermined by a user via a configuration file and a man-machine interface (MMI).

For example, Table 1 below presents the predetermined maximum monitoring thresholds for three resources.

TABLE 1

|  | CPU1 | Network usage | Disk usage |
|---|---|---|---|
| Predetermined monitoring threshold | 80% | 350 KBps | 60 o/s |

For the purposes of the invention, "computing infrastructure" is intended to mean a set of computing structures (i.e. computing devices) able to run an application or an application chain. The computing structure may be a server and may for example be composed of a presentation server, a business server and a data server. The computing infrastructure may also be a test server with the same resources as a production server, or else a clone of a virtual production server. The computing structure is preferably a server.

For the purposes of the invention, the term "application chain" corresponds to a set of applications, connected to one another by a stream of information and aiming to offer, through several processes, one or more functionalities which may be subject to a service level agreement. For the purpose of the invention, the expression "application block" corresponds to a component of an application. Combining application blocks is often necessary for running applications, in particular business applications, such as for example a web application, a content sharing platform or a computing platform. The application blocks of the computing infrastructure include, for example, an FTP server, an electronic messaging server, a Java application server and/or one or more databases.

For the purposes of the invention, "probe" or "computing probe" is intended to mean software associated with a device which makes it possible to carry out, manage and escalate to a computing device measurements intended to provide information regarding, inter alia, the operating state of the resources or the service level.

For the purposes of the invention, "anomaly" is intended to mean an overloading of the resources, or a saturation of the resources, or even a reduction in the available resources to below a predetermined threshold.

For the purposes of the invention, "prediction" is intended to mean the action of calculating the future consumption of resources of a computing infrastructure.

For the purposes of the invention, "modeling function" may correspond to an instruction, a protocol or a series of instructions making it possible to represent and/or model a behavior of the resource consumption over time.

For the purposes of the invention, "correlation function" is intended to mean an instruction, a protocol or a series of instructions enabling a mathematical or statistical link, or else making it possible to represent a dependency or a relationship due to a link, potentially causal, between several elements, preferably between at least two modeling functions.

For the purposes of the invention, "period" is intended to mean a duration of time which may comprises a plurality of time intervals. A period may correspond to one or more days, one or more weeks, one or more months, one or more years, but also to shorter periods, such as one or more hours.

For the purposes of the invention, "time interval" is intended to mean a space-time, limited in time between two instants. A time interval may correspond to one or more days, one or more weeks, one or more months, one or more years, but also to shorter periods, such as one or more hours.

For the purposes of the invention, the term "correlation" corresponds to a statistical relationship, whether causal or non-causal, between two variables or two functions or the values of two variables. This term denotes for example the proximity between two functions and the establishment of an ordered relationship. For the purposes of the invention, the term "causal" or "causality" corresponds to a causal statistical relationship between two functions. In particular, one of the functions is a cause which is entirely or partially responsible for the value of the other function, via an effect. The value of the first function may for example be considered to be a cause of a (current or future) value of the second function. Whether in terms of correlation or causality, one or more functions may have a statistical relationship with one or more other functions. Additionally, for the purposes of the invention, an indirect correlation or causation corresponds to the existence of a chain of correlation or causality links between a first function and another function. For example, a first function is correlated to a second function which in turn is correlated to a third function which is finally correlated to another function.

For the purposes of the invention, "substantially identical" or "similar" is intended to mean a value or a function which varies by less than 30% relative to the value or function with which it is compared, preferably by less than 20%, even more preferably by less than 10%.

For the purposes of the invention, "process", "calculate", "determine", "display", "extract", "compare" or, more broadly, an "executable operation", is intended to mean an action executed by a device or processor unless otherwise indicated by the context. In this respect, operations relate to actions and/or processes in a data processing system, for example a computing system or electronic computing device, which manipulates and transforms data represented as physical (electronic) quantities in the memories of the computing system or other devices for storing, transmitting or displaying information. These operations can be based on applications or software programs.

The terms or expressions "application", "software", "program code" and "executable code" mean any expression, code or notation in a set of instructions intended to cause data processing to perform a particular function directly or indirectly (e.g., after an operation of conversion to another code). Examples of program code can include, but are not limited to, a sub-program, a function, an executable application, a source code, an object code, a library and/or any other sequence of instructions designed for execution on a computer system.

For the purposes of the invention, "processor" is intended to mean at least one hardware circuit configured to execute operations according to instructions contained in a code. The physical circuit can be an integrated circuit. Examples of a processor include, but are not limited to, a central processing unit, a graphics processor, an application-specific integrated circuit (ASIC) and a programmable logic circuit.

For the purposes of the invention, "coupled" means directly or indirectly connected to one or more intermediate elements. Two elements may be coupled mechanically, electrically or linked by a communication channel.

In the remainder of the description, the same reference signs are used to designate the same elements.

Currently, information system administrators evolve their computing infrastructure by themselves, so as to always offer efficient business application services that are suited to their organization's requirements. The usage of resources over time may be dependent on a number of factors. For example, in the case of a business application comprising a calculation on a first machine, then the storage of the results on a second machine, the level of usage of the processors of the first machine will have an impact on the level of disk writing on the second machine. It is then difficult to precisely estimate the future demand for resources, since the administrator has to base this on historic facts and anticipate by themselves a potential risk or an anomaly (i.e. overload, saturation, etc.).

The inventors have therefore developed a novel method and device, making it possible to finally analyze the resource consumption in a computing infrastructure and, after a first configuration action aiming to characterize a behavior of a computing infrastructure, to calculate, from values of consumption of a first resource at a given time, the future consumption for one or more resources. This solution uses in particular the determination of a plurality of modeling functions and correlation functions that link these modeling functions.

According to a first aspect, the invention relates to a method 1 for analyzing a resource consumption in a computing infrastructure. The method according to the invention is particularly suited to a computing infrastructure comprising a plurality of computing devices. As will be detailed hereinafter, such a method enables the prediction of a resource consumption and therefore of a potential anomaly in the consumption of a resource of a computing device. It may also enable the generation of new sizing values for the computing infrastructure. Such new sizing values may make it possible to avoid the subsequent occurrence of an anomaly.

Figure 1:
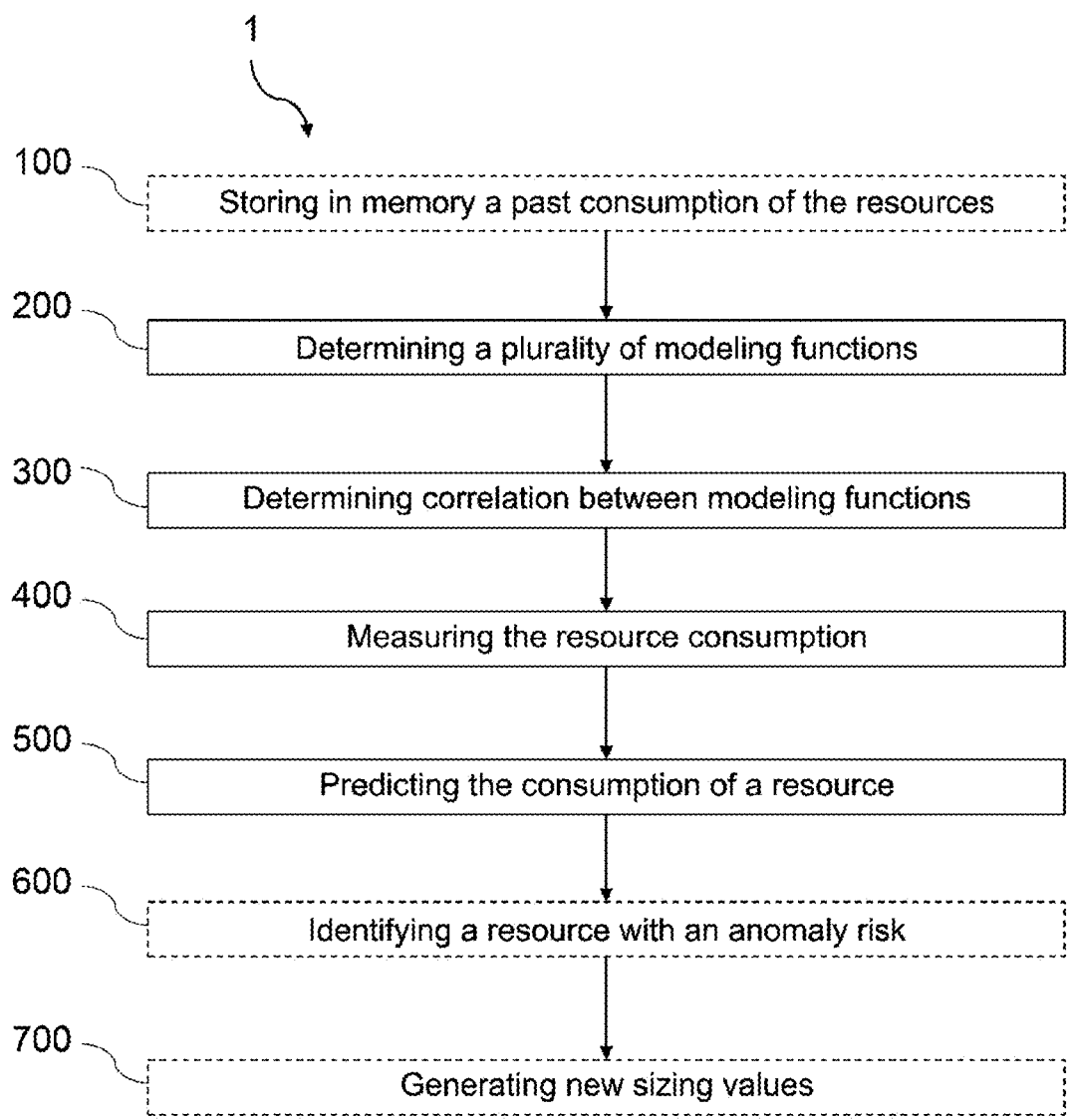

As shown in FIG. 1, the method according to the invention comprises a first configuration part, including determining 200 a plurality of modeling functions and also determining 300 correlations between modeling functions. The method subsequently comprises, preferably continuously, measuring 400 the consumption of at least one resource and, preferably in real time, predicting 500 the consumption of a resource of the computing infrastructure.

The method according to the invention can also comprise a step of storing in memory 100 a past consumption of the resources, a step of identifying 600 a resource with an anomaly risk, and a step of generating 700 new sizing values.

These different steps will be described in greater detail in the remainder of the description, and in particular in conjunction with the figures.

Thus, the method according to the invention may comprise a step 100 of storing in memory a past consumption of the resources. This step may be implemented by a memorization module, in particular configured to store in memory resource consumption values. This storing in memory may be carried out over a shorter or longer period of time, for example over one or more days, over one or more weeks, over one or more months, over one or more years. This step makes it possible to obtain one or more consumption profiles for each resource of each computing device of the computing infrastructure as a function of time. This may preferably be the storing in memory of a past consumption. As described in detail hereinafter, these resource consumption values may be generated using probes. The measurement of the consumption of a resource over a period of time or over a time interval may be measured during the execution of application blocks. These values may then be obtained by a plurality of probes configured to monitor the production behavior of the computing infrastructure.

The method may comprise a step of determining a maximum level of resource usage for each resource of the computing infrastructure. This step may also be carried out using probes. This makes it possible to determine the maximum level of usage of a resource before an anomaly appears.

The method according to the invention comprises a step 200 of determining a plurality of resource consumption modeling functions MF. Each of these modeling functions MF are capable of modeling the temporal evolution in the consumption of a resource over a time interval. In particular, each modeling function corresponds to a mathematical formula representing the evolution in the consumption of the resource over a time interval. This modeling relates in particular to a given period, and more particularly a time interval of the period. This step is preferably carried out by a modeling module. In particular, a given period may comprise several time intervals. Thus, the temporal evolution in the consumption of a resource may be modeled for each time interval of a given period.

The past consumption of each resource can be represented by a modeling function MF. An example of a plurality of resource consumption modeling functions MF is shown in FIG. 2.

FIG. 2 shows several periods (day 1, day 2, day 3, day 4) with, for each of these periods, two resources under consideration (CPU and DISK). In FIG. 2, a period corresponds to a day running from 0 h to 24 h. Nonetheless, a period might also have corresponded to a day running from 08.00 to 07.59. A period according to the invention may correspond, without being limited thereto, to an hour, a day, a week, a month or a year or any other period of time. Thus, for the same period, the evolution in the consumption of resources may be represented by a plurality of modeling functions. The modeling functions, and in particular combinations of modeling functions, make it possible to define the time intervals for each period. Each interval thus corresponds to a modeling function that models the temporal evolution in the consumption of a resource. Indeed, a modeling function MF makes it possible to model, preferably by a mathematical function, a resource consumption and the evolution thereof. For example, a modeling function may be of the ax+b type. Thus, for each period, intervals are identified, during which the evolution in the level of consumption of the resource can be modeled in the form of a modeling function.

FIG. 2 shows that a period can be divided into several time intervals and that each of these time intervals can be associated with a modeling function, denoted MFc 1, MFc 2, MFc 3, MFc 4, MFc 5. Each modeling function preferably represents the temporal evolution in the consumption of the same resource over a time interval. Thus, a plurality of different modeling functions can model the same period Furthermore, a modeling function allocated to a time interval may or may not vary based on the periods in question. For example, with reference to FIG. 2, the modeling function MFc 2 does not vary, or only varies very slightly, between day 1 MFc 2 and day 2 MFc 2'. On the other hand, the modeling function MFc 1 of day 1 is not found on day 2, and this same time interval on day 2 is modeled via a new modeling function MFc 7.

Based on this possible variability of modeling function between periods, and as shown in FIG. 2, it is possible to identify modeling functions which are identical or similar (i.e. substantially identical) as the periods pass, such as the modeling functions MFc 2", MFc 4", Fd 1", Fd 2".

Figure 3:
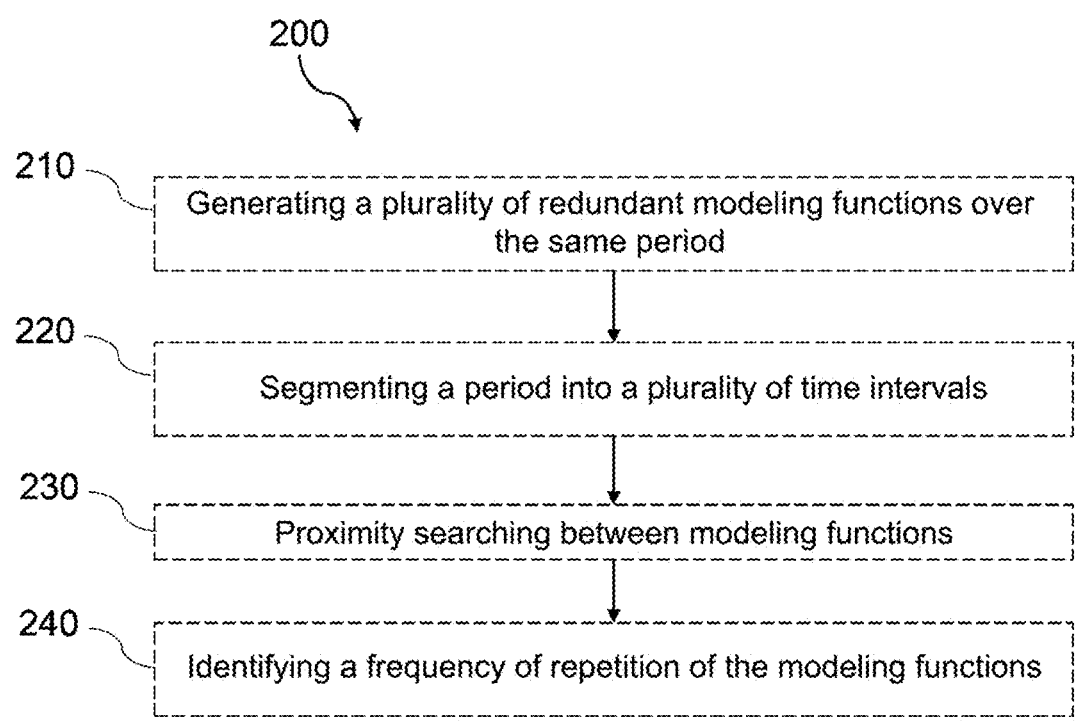
FIG. 3 shows the sub-steps of a step for determining a plurality of modeling functions according to one embodiment of the invention.

As shown in FIG. 3, step 200 of determining a plurality of modeling functions MF may comprise advantageous sub-steps. It may in particular comprise a step of generating 210 a plurality of redundant modeling functions over the same period. Indeed, several combinations of modeling functions can be generated from the same set of data.

As shown in FIG. 4, the same set of data can be modeled by a combination of 4, 2 or 8 modeling functions, corresponding to 4, 2 or 8 time intervals which may be of varying durations.

The method according to the invention may also comprise a step 220 of segmenting a period into a plurality of time intervals for each resource of each computing device 3. The time intervals can be defined based on the modeling functions or else based on a predetermined temporal segmentation. For the same resource, the time intervals are preferably identical between the periods. Nonetheless, they may also be different. The time intervals are preferably different between different resources. Nonetheless, they may also be identical.

The segmentation enables a precise representation of the change in consumption of each resource per time interval. The segmentation step may be implemented by a segmentation module. The segmentation of a period into a plurality of intervals for each resource of each computing device makes it possible to obtain several time intervals for the same period, representing the change in resource consumption for each resource of each computing device of the computing infrastructure. For example, when the period corresponds to a day, said period may be segmented into a plurality of intervals corresponding to a duration limited in terms of seconds, minutes or hours, and according to a plurality of identical or different modeling functions. The time intervals may be similar or different according to the modeling functions. In addition, the intervals may be defined according to load, work, time (hour, day, month, week, etc.).

According to an optional or additional embodiment, for the same period, several combinations of time intervals can be defined with different modeling functions. Thus, the method according to the invention may comprise the generation of several different sets of modeling functions associated with the same period. This makes it possible to obtain a plurality of modeling functions and time intervals for the same period. For example, FIG. 3 shows a change in the consumption of a resource over a period, represented by a dashed line. As shown, for the same resource and the same period, the method according to the invention may make it possible to determine a plurality of modeling functions and in particular a plurality of combinations of modeling functions. Thus, different time intervals can be generated based on modeling functions that model the consumption. In particular, according to a configuration A, the consumption is modeled by four modeling functions, while, according to a configuration B, the consumption is modeled by four modeling functions and, according to a configuration C, the consumption is modeled by eight modeling functions. Thus, preferably, the step of segmenting a period into a plurality of time intervals comprises a step of generating a plurality of combinations of modeling functions for each of the given periods, each of the modeling functions being associated with a time interval; a step of identifying combinations of modeling functions that are most representative of the periods; and a step of selecting the time intervals associated with these combinations of modeling functions.

These steps are preferably carried out several times for the whole duration of the past consumption of resources and for each resource of the computing infrastructure.

Additionally, the method may comprise a step 230 of proximity searching between modeling functions. A proximity search 230 according to the invention is preferably carried out between modeling functions MF of the same resource and of different data periods. This step may be implemented by a consolidation module. The proximity searching step makes it possible to refine the modeling functions based on periods for substantially identical intervals. Thus, the proximity searching between each modeling function comprises searching for mathematical proximity between modeling functions. For example, for a modeling function of ax+b type, of parameter a and parameter b, proximity is evaluated when b is different but remains invariable over the whole interval, and when a is different but remains invariable over the whole interval and retains the same sign. Thus, proximity is defined by the presence of a modeling function that is mathematically close to another modeling function and the parameters of which have identical or substantially identical values. In particular, step 230 of proximity searching between modeling functions can comprise the calculation of a distance between all the modeling functions generated or the implementation of univariate methods or optionally multivariate methods of the principal component analysis type or unsupervised preference classifications such as k-means or hierarchical ascendant classification.

Moreover, this proximity searching can be carried out over several periods, preferably similar periods, in particular over the different intervals identified during the step of determining a given period. Similar period is intended to mean periods with a duration in time which is identical or substantially identical. For example, a period 1 corresponding to a day is similar to a period 2 which also corresponds to a day. The day of period 1 and the day of period 2 being two different days.

Such a step of proximity searching preferably comprises the creation of a plurality of groups of modeling functions, each group comprising modeling functions classified as identical or similar during the proximity search. The step of proximity searching 230 may be followed by the creation of a new modeling function formed from different modeling functions considered to be similar.

The generation of modeling functions, or more specifically the search for proximity between each monitoring function, can be monitored by a step 240 of identifying a frequency of repetition of the modeling functions. This step may also be implemented by the consolidation module.

Once the modeling functions have been generated and optionally once a proximity search has been carried out, a method according to the invention may advantageously comprise a step of calculating the frequency of repetitions of the similar modeling functions for the same time interval over all the periods studied. The frequency of repetitions corresponds to the frequency of appearance of an identical or similar modeling function over different periods and over substantially identical time intervals. Additionally, the frequency of repetition may also correspond to a proportion of repetition of a modeling function during the periods. With reference to FIG. 2, the modeling function MFc 2 of day 1 is found in a similar form MFc 2' in day 2 and in day 3. Thus, the frequency of repetition is equal to 100%. Still according to FIG. 2, the modeling function MFc 1 of day 1 is found in an identical form in day 3. Thus, the frequency of repetition is equal to 66%.

Thus, the more a modeling function is found over similar intervals, the higher the frequency of repetition of this modeling function. This frequency of repetition may be counted in a simple manner, i.e. for each modeling function identified, the same value is added to each repeated frequency of repetition. Preferably, the value for implementation of the frequency of repetition has the same unit, for example a percentage or a numerical or alphanumerical value, as the predetermined repetition threshold. This makes it possible to define a frequency of repetition value for each modeling function and to compare this value to the previously defined repetition threshold. Thus, this subsequently enables a step of selecting, for each time interval, the modeling function which best represents this time interval as the periods pass. Preferably, the modeling functions having a frequency of repetition with a value below a predetermined repetition threshold are deleted, as shown in FIG. 2. This step can therefore benefit from the prior storage in memory of a predetermined repetition threshold. This repetition threshold can vary based on the resources or the periods. The repetition threshold makes it possible to determine which modeling functions can be retained in the context of the method according to the invention. The identification of a frequency of repetition is preferably carried out for each time interval and for the plurality of similar periods. Additionally, preferably, the proximity searching can be carried out for all the resources of the computing infrastructure and for the whole duration of past consumption. Additionally, these steps can also be applied when the periods are variable and/or the time intervals are different between periods.

The method according to the invention also comprises a step 300 of determining a correlation between said modeling functions. This step may be implemented by a calculation module.

The step of determining 300 a correlation may comprise the calculation of at least one correlation between modeling functions MF. Preferably, the step of determining a correlation comprises the calculation of at least one correlation between modeling functions MF that model different resources. More preferably, the step of determining a correlation comprises the calculation of at least one correlation between modeling functions MF that model identical or different resources for different time intervals.

These steps make it possible to determine correlations C1, C2, C3 as shown in FIG. 5 (a correlation being shown and represented by an arrow). For example, a correlation C1 is calculated between the modeling function MFc2 of the resource CPU for a first time interval and the modeling function MFc4 of the same resource CPU for a second time interval over the same period, day 1. This step may also make it possible to calculate a correlation C2 between the modeling function MFc2 of the resource CPU for a first time interval and the modeling function MFd2 of another resource DISK for a second time interval over the same period, day 1. Additionally, this step may also make it possible to calculate a correlation C3 between the modeling function MFd1 of the resource DISK for a first time interval and the modeling function MFc2' of another resource CPU for a second time interval over another period, day 2. In other words, the function modeling the consumption in terms of disk space over a first time interval may be correlated to a function modeling the consumption in terms of CPU over a time interval of the following day.

Thus, for each period, this step comprises searching for a function of correlation between at least two modeling functions. The correlation function is defined as being a mathematical function, of which the values of a modeling function, once applied to the correlation function, make it possible to obtain a value of at least one other modeling function. For example, a first modeling function, the value of which is xa+b, is correlated, by a correlation function of the type of multiplication by a factor of 2, to a second modeling function, the value of which is x2a+2b. The correlation function may correspond to any type of mathematical operation(s), and be of any sign, for example positive or negative.

A correlation function may be sought for the same resource and over the same period, or for different resources over the same period. This makes it possible to determine a correlation between resources and particularly between the consumption of different resources which may be dependent on one another for a given period. Additionally, a correlation function may be established between modeling functions of two different resources over the same time interval or over overlapping time intervals.

However, in order to perfect the prediction, a correlation function may also be sought for the same resource but over different periods. This makes it possible to predict the consumption of resources over time. A correlation function may also be sought for different resources over different periods.

Advantageously, the step of determining 300 a correlation between said modeling functions may comprise one or more sub-steps as shown in FIG. 6.

In particular, the method according to the invention may comprise a step 310 of generating a plurality of functions of correlation between modeling functions. Thus, the method may comprise a calculation of several functions of correlations between two modeling functions. This may lead to the generation of a plurality of correlation functions capable of describing, with a greater or lesser degree of accuracy, the relationships between the modeling functions.

Additionally, the method may comprise a step 320 of proximity searching between correlation functions. A proximity search 320 according to the invention is preferably carried out between correlation functions aiming to link identical or similar modeling functions. This step may be implemented by a consolidation module. The proximity searching step makes it possible to refine the correlation functions. For example, for a correlation function of the type of multiplication by a factor of 2, a proximity is considered when the other correlation function is also of the type of multiplication by a factor substantially equal to 2. Thus, proximity is defined by the presence of a correlation function that is mathematically close to another correlation function and the parameters of which have identical or substantially identical values. In particular, step 320 of proximity searching between correlation functions can comprise the calculation of a distance between all the correlation functions generated or the implementation of univariate methods or optionally multivariate methods of the principal component analysis type or unsupervised preference classifications such as k-means or hierarchical ascendant classification.

Such a step of proximity searching preferably comprises the creation of a plurality of groups of correlation functions, each group comprising correlation functions classified as similar during the proximity search. The step of proximity searching 320 may be followed by the creation of a new correlation function formed from different correlation functions considered to be similar.

Additionally, the method according to the invention may comprise a step 330 of identifying a frequency of repetition of the correlation functions. The frequency of repetitions of correlation corresponds to the frequency of appearance of the same correlation function between at least two modeling functions. Thus, the more frequently a correlation function is identified, the higher the frequency of repetition of this correlation function. This frequency of correlation may be counted in a simple manner, i.e. for each correlation function identified the same value is added to each repeated frequency of correlation. Preferably, the value for implementation of the frequency of correlation has the same unit, for example a percentage or a numerical or alphanumerical value, as the predetermined correlation repetition threshold. This makes it possible to define a frequency of correlation value for each correlation function and to compare this value to a previously defined correlation repetition threshold. As shown in FIG. 5, the correlation C1 is found over several periods in its form C1. Based on the periods shown on the graph, it has a frequency of repetition of 100%, whereas correlation C3 has a frequency of repetition of 66%. According to a preferred embodiment, if no correlation is determined for a modeling function, this function can be deleted. According to another preferred embodiment, when a correlation is found, it is considered to be validated if it is also found over at least part of the other periods and preferably over all of the other periods.

Moreover, the same modeling function can be correlated to several other modeling functions. Thus, the method may comprise a step 340 of determining a degree of reliability of a correlation. The degree of reliability may be determined based on the frequencies of repetition of the correlation functions. If a correlation function has a high frequency, the degree of reliability thereof is improved. Such a degree of reliability makes it possible to ensure optimal prediction of the resource consumption. Optionally, a predetermined threshold degree of reliability can be configured. In this case, it is possible that a validated correlation, but which has a degree of reliability below a predetermined threshold degree of reliability, is deleted.

Optionally, all of the preceding steps can be carried out several times. Preferably, these steps are carried out over the whole duration of past consumption. By virtue of the correlations established between modeling functions, a prediction of future consumptions can be made, either based on seasonality or based on the consumption of other resources, or based on seasonality and on the consumption of other resources.

The method according to the invention may comprise a step 400 of measuring resource consumption. This step may also be carried out using one or more probes.

This step may comprise measureringf a consumption value, preferably continuously. Continuously measuring corresponds for example to measurements carried out at a frequency of less than or equal to one hour, preferably less than or equal to thirty minutes, more preferably less than or equal to five minutes, for example less than or equal to ten seconds. It should be noted that not all resources will necessarily be measured at an identical frequency. The measurement of the consumption of a resource continuously over a period of time and in particular over a time interval may preferably be measured during the execution of application blocks on the computing infrastructure. These values may be obtained by a plurality of probes configured to monitor the behavior of the computing infrastructure. Optionally, the plurality of probes may more particularly make it possible to identify periodicities in the consumption of the resources.

The resource consumption measurement makes it possible to obtain a consumption profile for each resource as a function of time. This also makes it possible to identify resource anomalies. By virtue of the consumption measurement, a resource consumption value is obtained. Advantageously, this value can be obtained as a function of time. In particular, this step comprises the measurement of a consumption value of a first resource.

The method may comprise a step 500 of predicting the consumption of a resource. This step may be implemented by a prediction module. The prediction step 500 preferably enables a prediction of the consumption of a plurality of resources.

The prediction step may in particular comprise a calculation of a value of a future consumption of a resource to be predicted. This calculation may in particular be carried out using a consumption value of a first resource and a previously calculated correlation between modeling functions MF. In particular, the previously calculated correlation corresponds to a correlation value between a modeling function of the first resource and a modeling function of the resource to be predicted. When the resource to be predicted is the same as the first resource, then a method according to the invention makes it possible to calculate a future consumption value for this first resource over a subsequent time interval belonging to the same period or to a different period. Alternatively, the resource to be predicted may be a second resource different from the first resource. Then, a method according to the invention makes it possible to calculate a future consumption value for this second resource over a time interval, preferably subsequent, belonging to the same period or to a different period. Preferably, the calculation of a future consumption value involves the use of two modeling functions and a correlation function. In addition, this step can be repeated several times so as to predict the value of several resources.

The prediction step can therefore comprise calculating a value of future consumption of a resource from the consumption value of this same resource and from a previously calculated correlation between modeling functions. The prediction step can also comprise calculating a value of future consumption of a plurality of resources from the consumption value of the first resource and from a previously calculated correlation between modeling functions.

The prediction step can also comprise calculating a value of future consumption of a resource from the consumption value of a plurality of resources and from a previously calculated correlation between modeling functions.

In the context of a method according to the invention, the value of future consumption of a resource to be predicted is preferably determined in real time. In particular, starting from the measurement of resource consumption values, a method according to the invention is preferably configured to generate a value of future consumption of a resource within a time of less than or equal to ten minutes, more preferably less than or equal to five minutes, even more preferably less than or equal to one minute, starting from a measurement of consumption of a first resource. Thus, a method according to the invention is configured to predict resource consumption values at least fifteen minutes before the planned occurrence thereof, more preferably at least an hour before the planned occurrence thereof, and even more preferably at least several hours before the planned occurrence thereof, for example at least three hours before the planned occurrence thereof.

Advantageously, the prediction step makes it possible to predict the consumption of one or more resources and thereby to prevent any anomaly in the resource consumption on the computing infrastructure.

The prediction step makes it possible to anticipate the consumption of the plurality of resources of the computing infrastructure. Thus, it is possible to determine in advance a resource consumption anomaly which may lead to overconsumption, overloading, a reduction in available resources, saturation, etc. The prediction step may also make it possible to identify a potential risk of an anomaly in the consumption of resources arising over time.

Thus, advantageously, a method according to the invention may comprise a step 600 of identifying a resource with an anomaly risk. This step may be implemented by a monitoring module.

In the context of a step 600 for identifying a resource with an anomaly risk, the calculated value of future consumption of a resource to be predicted can be compared to a predetermined monitoring threshold. Thus, a method according to the invention may comprise a step of configuring a predetermined monitoring threshold, for example based on a maximum level of resource usage.

In addition, if the resource consumption prediction exceeds the monitoring threshold, the method may comprise a warning step, comprising the transmission of a message to an administrator client. This makes it possible to inform administrators that there is a risk of an anomaly occurring. Thus, corrective action may be taken before the anomaly occurs and leads to a malfunction or stoppage in the operation of the computing infrastructure.

Moreover, the monitoring threshold can be configurable. For example, this may be according to risk levels: low, medium, high, or normal, warning and critical. The monitoring threshold is also configurable based on the predicted resources, periods or even intervals. The monitoring threshold may also take into account the resource consumption if an interval has been exceeded or not complied with, or a period has been exceeded or not complied with.

According to one embodiment, the method may comprise a step of updating the resource consumption values of the computing infrastructure. This makes it possible to ensure the quality of the prediction. Additionally, updating also makes it possible to monitor the evolution of the computing infrastructure and to adapt the predictions. In this context, the method according to the invention advantageously comprises a repetition of the steps of storing in memory 100, determining modeling functions 200, and determining correlations 300 between modeling functions.

The method according to the invention may comprise taking corrective actions when a threshold is exceeded. A corrective action may be selected from: allocating an additional resource for a time period or a time interval based on a previously calculated correlation between functions, modifying the amount of resource allocated, for the same interval, reducing or increasing a resource based on the expected quality of service based on the previously calculated correlations between functions.

Thus, advantageously, the method according to the invention may comprise a step 700 of generating new sizing values for the computing infrastructure. This step may be implemented by an optimization module.

In particular, a method according to the invention may comprise generating at least one optimized sizing plan, said generation step comprising the selection of new values of amount of resources allocated for the optimized sizing plan for which the resource consumption is lower than predetermined maximum consumption values based on the established predictions.

The method according to the invention can make it possible to calculate the minimum sizing of resources of the computing infrastructure required for the correct execution of the application chains. It makes it possible for example to determine the minimum sizing enabling the execution of the application chains while complying with the predicted resource consumption over time and the correlations between resources.

The step of generating at least one optimized sizing plan may comprise the generation of resource amount values based on the predictions, the measured resource consumption and the maximum level of resource usage. Thus, a plurality of values can be generated, for example randomly.

The generation of resource amount values can be followed by a step of calculating new maximum levels of resource usage. This calculation may be carried out for each resource amount value generated. This makes it possible to optimize the amount of resources which will be allocated and to ensure the correct operation of the computing infrastructure. Moreover, the generation step may comprise the selection of new values of allocated resource amounts for the optimized sizing plan. These new values are selected from the values generated during the step and correspond to values for which the prediction complies with the monitoring threshold. Alternatively, the IS administrator can select suitable resource amount values.

Additionally, the method according to the invention may comprise the generation of a plurality of optimized sizing plans. The generation of a plurality of optimized sizing plans enables an IS administrator to select the one for which the available and/or predicted resources correspond to the required resources. Thus, in the case of generation of a plurality of optimized sizing plans, the selection of a sizing plan to be applied can be left to a user. Nonetheless, advantageously, the method according to the invention can comprise a step of automatic selection of an optimized sizing plan.

Following the step of generating at least one optimized sizing plan, or following the optional selection of an optimized sizing plan, the method according to the invention can further comprise a step of verifying compliance with the monitoring thresholds, for example during the implementation thereof on a computing infrastructure corresponding to the new optimized sizing plan.

According to a second aspect, the invention relates to a device 2 for analyzing a resource consumption in a computing infrastructure.

In particular, as shown in FIG. 7, the analysis device 2 comprises a modeling module 20, a calculation module 50, a prediction module 60 and at least one probe 90. The analysis device 2 may also comprise a memorization module 10, a segmentation module 30, a consolidation module 40, a warning module 70 and a sizing module 80. These modules can comprise a processor for executing at least one instruction. Additionally, they can comprise, or be coupled to, other means such as combinations of processors, of memory and also of codes supporting instructions.

The memorization module 10 is advantageously configured to store in memory resource consumptions, preferably past resource consumptions. This storing in memory may be carried out over a shorter or longer period of time, for example over one or more days, over one or more weeks, over one or more months, over one or more years. The memorization module 10 may comprise a short-term memory and/or a long-term memory. The long-term memory may be a support such as a CD-ROM, a memory card, a local hard drive or a hard drive hosted by a remote server. The memorization module is preferably in the form of a local hard drive. The memorization module is in particular able to store, for example in the form of one or more files, data generated by an MMI or by consumption probes or else data acquired via another module. This data may for example correspond to data relating to the capacities of the computing infrastructure, to the requirements of the application chains, to the available resources or else to predetermined operating parameters or to identified periods of time (e.g. activities).

For example, the memorization module is preferably configured to store in memory one or more consumptions of a plurality of resources of a computing infrastructure. For this purpose, the memorization module can comprise any computer-readable support known in the art comprising, for example, a volatile memory, such as a static random access memory (SRAM) and a dynamic random access memory (DRAM), and/or a non-volatile memory, such as a read-only memory, flash memories, hard drives, optical disks and magnetic tapes. The memorization module may comprise a plurality of instructions or modules or applications for performing various functions. Thus, the memorization module may execute routines, programs, or data structures of matrix type. The memorization module, like the other modules, may for example be connected to the other components of the system or of the device.

The memorization module 10 is advantageously configured to store in memory at least two periods of time (or activities) associated with different resource requirements.

The data stored in memory, and also the periods of activities, may have been input, starting from start-up or over time, by a user via an MMI. Indeed, the administrator of the IS generally knows the usage history and also the forecasts. Alternatively, the data stored in memory may have been acquired via probes (computing probes or consumption probes). More particularly, for each period of time (e.g. time interval associated with different resource requirements), a period start date and a period end date and the resource requirement are stored in memory.

Additionally, the values of the resource requirements stored in memory are for example:
- a period start date,
- a period end date, and/or
- a list of the application blocks with their resource requirements (e.g. random access memory consumed, disk memory consumed, rate of CPU usage)

The device 2 according to the invention can comprise a modeling module 20. The modeling module is configured to determine, for a given period, a plurality of resource consumption modeling functions, each of said functions modeling the temporal change in the consumption of a resource for a time interval.

The modeling module can comprise a processor for the execution of at least one modeling function, for modeling the temporal evolution in the resource consumption. Additionally, the modeling module can comprise, or be coupled to, other means such as combinations of processors, of memory and also of codes supporting instructions, or to a repository comprising a plurality of mathematical functions stored in memory. The modeling module 20 is configured to allocate a mathematical function from the repository to the temporal evolution of each resource, in particular by means of a processor.

Thus, each interval of the period will be modeled and associated with one or more modeling functions contained in the memory of the modeling module, which makes it possible to obtain models to define the evolution in consumption of a resource for a time interval of the period and more broadly for the period.

This or these modeling functions may for example be acquired by the modeling module, via use of one or more modeling files stored in memory on the memorization module 10 or else of instructions transmitted from an interface (e.g. graphics). Thus, the modeling module can be configured to receive, and take into account, modeling functions for example stored in a memory such as a non-volatile memory.

In particular, the modeling module according to the invention is able to, is preferably configured for, storing in memory one or more modeling functions.

The device according to the invention can comprise a segmentation module 30. The segmentation module is for example configured to segment a period into a plurality of intervals for each resource of each computing device. The segmentation module makes it possible to obtain a plurality of intervals for the same period which can be used for modeling the change in the resource consumption for each resource of each computing device of the computing infrastructure according to one or more modeling functions. The segmentation module 30 can communicate with the modeling module 20 in order to segment a period according to the modeling functions that best model a period. Additionally, the segmentation module 30 can be configurable. Thus, the segmentation module 30 can be configured to define time intervals corresponding to a duration limited in terms of seconds, minutes, hours or any other time-limited duration. The segmentation module can also be configurable according to the load, the work, the time.

The device according to the invention can comprise a consolidation module 40. The consolidation module is preferably configured to seek a proximity between each determined consumption modeling function and the plurality of intervals of a period for each resource of each application chain. This consolidation module 40 makes it possible to refine the modeling functions based on periods for substantially identical intervals. The consolidation module is also configured to identify a frequency of repetition of the modeling functions. The consolidation module can comprise a memory able to store in memory a previously defined repetition threshold. Additionally, the consolidation module is able to define a frequency of repetition value for each modeling function and to compare this value to the previously defined repetition threshold. This thus makes it possible to more precisely refine the proximity search between each consumption modeling function. Preferably, the frequencies of repetition with a value below the predetermined repetition threshold are deleted.

The device according to the invention can comprise a calculation module 50. The calculation module is advantageously configured for determining correlations between the resource consumption modeling functions. In particular, the calculation module is configured for calculating at least one correlation between modeling functions modeling identical or different, preferably different, and preferably for different time intervals.

The calculation module can enable refinement by correlation. Additionally, the calculation module can be configured to determine a frequency of repetition value for the correlation frequency. The calculation module can comprise a memory able to store in memory a previously defined correlation repetition threshold. Additionally, the calculation module is able to define a frequency of repetition value for each modeling function and to compare this value to the previously defined repetition threshold. This thus enables a proximity search between each consumption modeling function. Preferably, the correlation frequencies with a value below the predetermined correlation repetition threshold are deleted. Moreover, the calculation module can also be configured to determine a degree of reliability. The calculation module is able to cross over the different correlation functions or frequencies of repetition of the correlation frequencies. If several correlation frequencies are found, or if several frequencies of repetition of the correlation frequencies are found, the calculation module is able to implement the degree of reliability. This makes it possible to improve and refine the degree of reliability.

The device according to the invention can comprise one or a plurality of probes 90. Alternatively, the device according to the invention can be coupled to one or several probes 90.

The probes 90 are configured in particular for measuring the resource consumption of each resource of each application chain. The probe(s) make it possible to collect data on the consumption of the resources of the computing infrastructure and more particularly of each application chain, or machine, composing it. Several resources can be measured in parallel.

These measurements can be carried out using a probe, for example a "Nigel's Monitor" (Nmon) or "Performance Monitor" (Perfmon) probe. Nmon probes make it possible for example to display CPU, memory, swap or network data and information on users, groups, storage media, on the use of the kernel, or the processes that consume the most. Perfmon probes make it possible to measure the performance of a computing infrastructure. The information collected may for example correspond to percentages of resource usage, response times, processing times, but also the status of the ports, the number of JDBC or JMS message queues, the occupancy level of the file system, the operating rate of the garbage collector for J2EE (Java Enterprise Edition) applications.

These probes may be associated with each parameter (e.g. resource) for returning the measurement information or metrics, representing for example the operating state of the resources and particularly the associated consumption. For each parameter, the probe(s) define a parameter identifier and a parameter value. The parameter values may be monitored continuously or at configurable intervals so as to obtain information for each parameter as a function of time. This information can be stored in a memory such as for example in the memorization module. In some embodiments, the device comprises an MMI making it possible to define the probes on each machine which return the metrics resulting from the use of the resources of the machine.

Such resource consumptions can be stored in memory in at least one matrix table stored in memory, the resource number of which defines a dimension of the matrix table, the number of time ranges assigned defining another dimension of the matrix table, and the usage percentages of the resource constituting the coefficient of an additional row or column. This information can preferably be re-transcribed in the form of a machine matrix Mj stored in a memory, each row of the machine matrix Mj representing a resource of the machine (CPU, RAM, etc.), each column of the matrix representing a time range and each value present in a box of the row of a resource representing the consumption of this resource for the time period defined for the column. Moreover, the probes can be configured for measuring the maximum level of resource usage for each resource of the computing infrastructure.

The device according to the invention can comprise a prediction module 60. The prediction module is advantageously configured for predicting the resource consumption. Additionally, the prediction module can be configured to calculate a future consumption value.

The device according to the invention can comprise a warning module 70 configured to emit a warning when a prediction, a threshold, or a level of usage or consumption is not complied with or is exceeded. This makes it possible to warn the administrators.

A sizing module 80 according to the invention is in particular configured to select resource amount values assigned for the at least one optimized sizing plan, for which there is no longer a prediction of anomalies.

According to another aspect, the invention relates to a computing infrastructure 5 configured to enable an analysis of resource consumption for the prediction of an anomaly in the consumption of one of the resources thereof, said computing infrastructure being able to comprise, as shown in FIG. 8, an analysis device according to the invention.

The computing infrastructure preferably comprises a plurality of computing devices 3 such as servers. Additionally, it comprises or is coupled to a resource consumption analysis device 2 according to the invention. A computing infrastructure 5 is more particularly a production computing infrastructure, the resources of which are used by application chains 4 consisting of application blocks 4a, 4b, 4c, 4d. When an action is attributed to the computing infrastructure according to the invention, it is actually performed by a microprocessor controlled by instruction codes stored in a memory. If an action is attributed to an application, it is actually performed by a microprocessor of the computing infrastructure, in a memory in which the instruction codes corresponding to the application are stored. An application chain comprises a set of resources which are used entirely or partially by a plurality of servers.

What is claimed is:

1. A method of analyzing a consumption of resources in a computing infrastructure, said computing infrastructure comprising a plurality of computing devices, to predict a resource consumption anomaly on a computing device of the plurality of computing devices, said method comprising:
   determining, for a given period, a plurality of resource consumption modeling functions, wherein each resource consumption modeling function of said plurality of resource consumption modeling functions models a temporal evolution in the consumption of a resource for a time interval of the given period;
   proximity searching between modeling functions of said plurality of resource consumption modeling functions, said proximity searching being carried out between said modeling functions of a same resource and of different data periods;
   determining a correlation between said plurality of resource consumption modeling functions, wherein said determining said correlation comprises calculation of at least one correlation between said modeling functions for different time intervals;
   measuring a resource consumption, wherein said measuring comprises a measurement of a consumption value of a first resource of said resources;
   predicting the resource consumption of the computing infrastructure, wherein said predicting comprises a calculation of a value of future consumption of a resource to be predicted from the consumption value of the first resource and from a previously calculated correlation between said modeling functions, wherein said previously calculated correlation corresponds to a correlation between a modeling function of the first resource and a modeling function of the resource to be predicted;
   generating one optimized sizing plan, said generating comprising a selection of new values of amount of resources allocated for the one optimized sizing plan for which the resource consumption is lower than predetermined maximum consumption values based on the resource consumption of the computing infrastructure that is predicted; and
   implementing the one optimized sizing plan on the computing infrastructure.

2. The method of analyzing according to claim 1, further comprising generating a plurality of redundant modeling functions over a same period.

3. The method of analyzing according to claim 1, further comprising segmenting the given period into a plurality of time intervals for each resource of said resources of each computing device of said plurality of computing devices.

4. The method of analyzing according to claim 3, wherein the plurality of time intervals resulting from the segmenting of the given period are defined based on the modeling functions or based on a predetermined temporal segmentation.

5. The method of analyzing according to claim 1, further comprising identifying a frequency of repetition of the modeling functions and selecting, for each time interval, a modeling function most representative of said each time interval for a set of periods considered.

6. The method of analyzing according to claim 1, further comprising generating a plurality of functions of correlation between said modeling functions.

7. The method of analyzing according to claim 1, wherein the previously calculated correlation is a function of correlation between two modeling functions of said plurality of resource consumption modeling functions.

8. The method of analyzing according to claim 1, further comprising identifying a correlation repetition frequency.

9. The method of analyzing according to claim 1, further comprising determining a degree of reliability of a correlation, and deleting correlations having said degree of reliability below a predetermined threshold.

10. The method of analyzing according to claim 1, further comprising identifying a resource with an anomaly risk, said identifying said resource with said anomaly risk comprising comparing the value of future consumption of the resource to be predicted with a predetermined monitoring threshold value, wherein the resource to be predicted is the resource with the anomaly risk when the predetermined monitoring threshold value is exceeded.

11. The method of analyzing according to claim 1, wherein said predicting said resource consumption further comprises calculating said value of future consumption of said resource from the consumption value of said resource and from said previously calculated correlation between said modeling functions.

12. The method of analyzing according to claim 1, wherein said predicting said resource consumption further comprises calculating said value of future consumption of said resource from the consumption value of a plurality of resources and from said previously calculated correlation between said modeling functions.

13. A device for analyzing consumption of resources in a computing infrastructure, said computing infrastructure comprising a plurality of computing devices, to predict a resource consumption anomaly on a computing device of said plurality of computing devices, said device comprising:
  a modeling module configured to determine, for a given period, a plurality of resource consumption modeling functions, each resource consumption modeling function of said plurality of resource consumption modeling functions model a temporal evolution in the consumption of a resource of said resources for a time interval of the given period;
  a consolidation module configured to seek a proximity between each consumption modeling function of said plurality of resource consumption modeling functions that are determined and a plurality of intervals of a period for each resource of said resources;
  a calculation module configured to determine a correlation between said plurality of resource consumption modeling functions, wherein said determine the correlation comprises calculation of at least one correlation between modeling functions of said plurality of resource consumption modeling functions, for different time intervals;
  at least one probe configured to measure resource consumption, wherein the measure the resource consumption comprises a measurement of a consumption value of a first resource of said resources;
  a module for predicting the resource consumption of the computing infrastructure, wherein said module for predicting is configured to calculate a value of future consumption of a resource to be predicted, from the consumption value of the first resource and from a previously calculated correlation between said modeling functions, wherein said previously calculated correlation corresponds to a correlation between a modeling function of the first resource and a modeling function of the resource to be predicted;
  a sizing module configured to generate one optimized sizing plan, said generating comprising a selection of new values of amount of resources allocated for the one optimized sizing plan for which the resource consumption is lower than predetermined maximum consumption values based on the resource consumption of the computing infrastructure that is predicted; and
  wherein the one optimized sizing plan is implemented on the computing infrastructure.

14. A computing infrastructure comprising:
a plurality of computing devices, and
an analysis device for analyzing consumption of resources in said computing infrastructure, for predicting a resource consumption anomaly on a computing device of the plurality of computing devices, said analysis device comprising
  a modeling module configured to determine, for a given period, a plurality of resource consumption modeling functions, each resource consumption modeling function of said plurality of resource consumption modeling functions model a temporal evolution in the consumption of a resource of said resources for a time interval of the given period;
  a consolidation module configured to seek a proximity between each consumption modeling function of said plurality of resource consumption modeling functions that are determined and a plurality of intervals of a period for each resource of said resources;
  a calculation module configured to determine a correlation between said plurality of resource consumption modeling functions, wherein said determine the correlation comprises calculation of at least one correlation between modeling functions of said plurality of resource consumption modeling functions, for different time intervals;
  at least one probe configured to measure resource consumption, wherein the measure the resource consumption comprises a measurement of a consumption value of a first resource of said resources;
  a module for predicting the resource consumption of the computing infrastructure, wherein said module for predicting is configured to calculate a value of future consumption of a resource to be predicted, from the consumption value of the first resource and from a previously calculated correlation between said modeling functions, wherein said previously calculated correlation corresponds to a correlation between a modeling function of the first resource and a modeling function of the resource to be predicted;
  a sizing module configured to generate one optimized sizing plan, said generating comprising a selection of new values of amount of resources allocated for the one optimized sizing plan for which the resource consumption is lower than predetermined maximum consumption values based on the resource consumption of the computing infrastructure that is predicted; and
  wherein the one optimized sizing plan is implemented on the computing infrastructure.

* * * * *